(12) United States Patent
Yamaguchi et al.

(10) Patent No.: US 11,331,750 B2
(45) Date of Patent: May 17, 2022

(54) MACHINING ROOM

(71) Applicant: KOMATSU INDUSTRIES CORPORATION, Kanazawa (JP)

(72) Inventors: Yoshihiro Yamaguchi, Kaga (JP); Kazuyuki Kitamura, Komatsu (JP); Youichirou Shimizu, Komatsu (JP)

(73) Assignee: KOMATSU INDUSTRIES CORPORATION, Ishikawa (JP)

( * ) Notice: Subject to any disclaimer, the term of this patent is extended or adjusted under 35 U.S.C. 154(b) by 599 days.

(21) Appl. No.: 16/320,275

(22) PCT Filed: Nov. 1, 2017

(86) PCT No.: PCT/JP2017/039488
§ 371 (c)(1),
(2) Date: Jan. 24, 2019

(87) PCT Pub. No.: WO2018/088290
PCT Pub. Date: May 17, 2018

(65) Prior Publication Data
US 2019/0270162 A1   Sep. 5, 2019

(30) Foreign Application Priority Data
Nov. 9, 2016   (JP) .............................. JP2016-219096

(51) Int. Cl.
*B23K 26/12* (2014.01)
*B23K 26/142* (2014.01)
(Continued)

(52) U.S. Cl.
CPC .......... *B23K 26/127* (2013.01); *B23K 26/142* (2015.10); *B23K 26/16* (2013.01); *B23K 26/38* (2013.01); *F24F 7/10* (2013.01)

(58) Field of Classification Search
CPC .... B23K 26/127; B23K 26/142; B23K 26/16; B23K 26/38; F24F 7/10
(Continued)

(56) References Cited

U.S. PATENT DOCUMENTS 1,706,694 A * 3/1929 Kimbel .................... B60Q 3/43
362/480
2,189,008 A * 2/1940 Kurth .................. F21V 33/0088
454/242
(Continued)

FOREIGN PATENT DOCUMENTS

DE        3041991 A1    5/1982
JP        67-12551 U    1/1982
(Continued)

OTHER PUBLICATIONS

The Office Action for the corresponding Korean application No. 10-2018-7036518, dated Apr. 1, 2020.
(Continued)

*Primary Examiner* — Jimmy Chou
(74) *Attorney, Agent, or Firm* — Global IP Counselors, LLP

(57) ABSTRACT

A three-dimensional laser cutter can be disposed in a machining room. The machining room includes a ceiling and a plate member. The ceiling is provided with a suction port connected to a suction device. The plate member is disposed below the ceiling with a gap therebetween. The plate member forms a space with the ceiling.

15 Claims, 16 Drawing Sheets

(51) Int. Cl.
  *B23K 26/16* (2006.01)
  *B23K 26/38* (2014.01)
  *F24F 7/10* (2006.01)

(58) Field of Classification Search
  USPC ...... 219/121.86; 454/349, 52, 248, 292, 354
  See application file for complete search history.

(56) References Cited

U.S. PATENT DOCUMENTS

| | | | | |
|---|---|---|---|---|
| 2,278,581 A * | 4/1942 | Dexter | F24F 7/007 |
| | | | 454/348 |
| 2,780,981 A * | 2/1957 | Miller | F24F 7/065 |
| | | | 454/346 |
| 2,875,316 A * | 2/1959 | Ford | F24H 3/0411 |
| | | | 219/473 |
| 2,885,948 A * | 5/1959 | Oshins | E04D 13/0325 |
| | | | 454/199 |
| 3,028,475 A * | 4/1962 | Nash | F24H 3/0411 |
| | | | 219/201 |
| 3,068,341 A * | 12/1962 | Ortiz | F24H 3/0411 |
| | | | 219/220 |
| 3,085,490 A * | 4/1963 | Field | F24F 7/025 |
| | | | 52/200 |
| 3,103,156 A * | 9/1963 | Quin | F24F 13/08 |
| | | | 454/248 |
| 3,305,168 A * | 2/1967 | Tiberiu | B60Q 3/74 |
| | | | 416/146 R |
| 3,612,814 A * | 10/1971 | Houldcroft | B23K 26/142 |
| | | | 219/121.67 |
| 3,784,183 A * | 1/1974 | Castro | B23K 26/1462 |
| | | | 269/20 |
| 3,785,271 A * | 1/1974 | Joy | F24F 7/025 |
| | | | 454/356 |
| 3,866,398 A * | 2/1975 | Vernon, Jr | B23K 26/142 |
| | | | 134/1.3 |
| 3,909,589 A * | 9/1975 | Stone | F24F 7/06 |
| | | | 392/347 |
| 4,149,062 A * | 4/1979 | Limmer | B23K 26/1423 |
| | | | 219/121.68 |
| 4,162,390 A * | 7/1979 | Kelly | B23K 26/12 |
| | | | 219/121.63 |
| 4,278,867 A * | 7/1981 | Tan | B23K 1/0056 |
| | | | 219/121.64 |
| 4,315,133 A * | 2/1982 | Morgan | B23K 26/1488 |
| | | | 219/121.84 |
| 4,449,166 A * | 5/1984 | Sharp | F21V 33/0088 |
| | | | 362/149 |
| 4,544,824 A * | 10/1985 | Knutsson | A41H 43/0292 |
| | | | 219/121.67 |
| 4,665,806 A * | 5/1987 | Martin, Sr. | F24F 13/06 |
| | | | 454/299 |
| 4,681,024 A * | 7/1987 | Ivey | F24H 3/0411 |
| | | | 219/220 |
| 4,846,261 A * | 7/1989 | Kittila | F04D 19/005 |
| | | | 165/54 |
| 4,897,520 A * | 1/1990 | Carter | B08B 15/04 |
| | | | 219/121.68 |
| 4,955,285 A * | 9/1990 | Geilinger | F24F 12/006 |
| | | | 454/338 |
| 5,259,816 A * | 11/1993 | Ke | F24F 3/12 |
| | | | 454/244 |
| 5,504,301 A * | 4/1996 | Eveland | B23K 26/18 |
| | | | 219/121.67 |
| 5,664,872 A * | 9/1997 | Spearman | F21V 33/0096 |
| | | | 362/96 |
| 5,906,760 A * | 5/1999 | Robb | B08B 15/00 |
| | | | 219/121.67 |
| 5,909,534 A * | 6/1999 | Ko | F24H 3/0411 |
| | | | 392/376 |
| 5,918,972 A * | 7/1999 | Van Belle | F21V 21/04 |
| | | | 362/480 |
| 5,934,362 A * | 8/1999 | Barker, II | F24F 7/06 |
| | | | 165/48.1 |
| 5,934,783 A * | 8/1999 | Yoshikawa | F21V 33/0096 |
| | | | 362/96 |
| 6,142,645 A * | 11/2000 | Han | E04D 13/0325 |
| | | | 362/147 |
| 6,264,547 B1 * | 7/2001 | Walti | B05B 16/60 |
| | | | 454/52 |
| 6,979,169 B2 * | 12/2005 | Penlesky | F04D 29/4226 |
| | | | 415/1 |
| 7,128,303 B2 * | 10/2006 | Penlesky | F04D 29/601 |
| | | | 248/674 |
| 7,175,309 B2 * | 2/2007 | Craw | F21V 33/0092 |
| | | | 362/253 |
| 7,470,043 B2 * | 12/2008 | Mehta | F21V 23/04 |
| | | | 362/257 |
| 7,607,935 B2 * | 10/2009 | Dahl | F21V 33/0088 |
| | | | 439/485 |
| D618,782 S * | 6/2010 | Zakula | D23/385 |
| 8,382,332 B2 * | 2/2013 | Zakula | F21V 23/0464 |
| | | | 362/294 |
| 8,603,217 B2 * | 12/2013 | Sukhman | B01D 53/0446 |
| | | | 95/8 |
| 8,961,126 B1 * | 2/2015 | Tom | F24F 13/078 |
| | | | 415/213.1 |
| 8,967,832 B2 * | 3/2015 | Zakula | F21V 33/0088 |
| | | | 362/294 |
| 9,476,608 B2 * | 10/2016 | Yang | F21S 8/026 |
| 9,609,407 B2 * | 3/2017 | Berkman | H04R 1/021 |
| 10,060,617 B2 * | 8/2018 | Horng | F24R 13/078 |
| 10,315,273 B2 * | 6/2019 | Yoshii | B23K 26/142 |
| 10,731,891 B2 * | 8/2020 | Khalil | F24F 7/06 |
| 10,753,627 B1 * | 8/2020 | Stevenson | F24F 13/06 |
| 10,830,465 B2 * | 11/2020 | Singh | F24F 13/20 |
| 10,837,662 B2 * | 11/2020 | Maeda | F24F 7/007 |
| 10,962,023 B2 * | 3/2021 | Huang | F04D 29/602 |
| 2003/0080096 A1 | 5/2003 | Yamaguchi | B23K 37/0461 |
| | | | 219/121.39 |
| 2007/0151958 A1 * | 7/2007 | Modra | B23K 26/38 |
| | | | 219/121.67 |
| 2007/0202798 A1 * | 8/2007 | Billiotte | F24F 3/16 |
| | | | 454/264 |
| 2008/0062643 A1 | 3/2008 | Mehta | |
| 2008/0217329 A1 * | 9/2008 | Braunisch | H05B 6/6423 |
| | | | 219/757 |
| 2008/0232116 A1 * | 9/2008 | Kim | F21V 21/03 |
| | | | 362/365 |
| 2009/0020513 A1 * | 1/2009 | O'Halloran | B23K 26/40 |
| | | | 219/121.72 |
| 2009/0170421 A1 * | 7/2009 | Adrian | F24F 13/06 |
| | | | 454/349 |
| 2009/0223944 A1 * | 9/2009 | Sukhman | B23K 26/364 |
| | | | 219/121.84 |
| 2009/0250443 A1 * | 10/2009 | Kim | H01L 21/67069 |
| | | | 219/121.36 |
| 2009/0255910 A1 * | 10/2009 | Feistel | B23K 26/706 |
| | | | 219/121.67 |
| 2010/0009621 A1 * | 1/2010 | Hsieh | F24F 7/007 |
| | | | 454/293 |
| 2010/0028502 A1 * | 2/2010 | Han | A23L 5/15 |
| | | | 426/235 |
| 2010/0031820 A1 * | 2/2010 | Minkkinen | F24H 8/00 |
| | | | 95/126 |
| 2010/0050678 A1 * | 3/2010 | Ikeda | F24F 1/0063 |
| | | | 62/291 |
| 2010/0108648 A1 * | 5/2010 | Koseki | B26F 3/004 |
| | | | 219/121.67 |
| 2010/0112926 A1 * | 5/2010 | Ozeki | F24F 9/00 |
| | | | 454/187 |
| 2010/0275636 A1 * | 11/2010 | Yoshimura | A01N 1/0263 |
| | | | 62/374 |
| 2011/0124279 A1 * | 5/2011 | Paavilainen | F24F 1/0047 |
| | | | 454/264 |
| 2011/0290276 A1 * | 12/2011 | Cha | B23K 26/127 |
| | | | 134/1 |

(56) References Cited

U.S. PATENT DOCUMENTS

| | | | |
|---|---|---|---|
| 2012/0055908 A1* | 3/2012 | Park | B23K 26/361 219/121.62 |
| 2012/0170255 A1* | 7/2012 | McMillan | F21S 8/04 362/147 |
| 2013/0001206 A1* | 1/2013 | Yamamoto | B23K 26/14 219/121.72 |
| 2013/0017775 A1* | 1/2013 | Chwala | F24F 7/025 454/367 |
| 2013/0210336 A1* | 8/2013 | Ludi | E04B 9/006 454/252 |
| 2013/0266443 A1* | 10/2013 | Yang | F21V 33/0096 416/5 |
| 2014/0063796 A1* | 3/2014 | Zakula | F24F 13/078 362/231 |
| 2014/0254167 A1* | 9/2014 | Kennedy | F21V 7/00 362/294 |
| 2014/0360805 A1* | 12/2014 | Berkman | H04R 1/02 181/141 |
| 2015/0013783 A1* | 1/2015 | Palmerton | B01D 46/0036 137/356 |
| 2015/0224596 A1* | 8/2015 | Schiebout | B23K 26/0096 219/121.61 |
| 2015/0228528 A1* | 8/2015 | Behdjat | H01L 21/6875 219/392 |
| 2015/0352667 A1* | 12/2015 | Hemes | B23K 26/144 219/121.61 |
| 2016/0148823 A1* | 5/2016 | George | F27D 3/0084 432/201 |
| 2016/0252263 A1* | 9/2016 | Chwala | F24F 7/02 454/354 |
| 2018/0045204 A1* | 2/2018 | Van Grootheest | F04D 25/088 |
| 2018/0066838 A1* | 3/2018 | Huang | F04D 29/282 |
| 2019/0145652 A1* | 5/2019 | Sinur | F21V 33/0096 454/294 |

FOREIGN PATENT DOCUMENTS

| | | |
|---|---|---|
| JP | 67-89142 U | 6/1982 |
| JP | 4-113183 U | 10/1992 |
| JP | 2000-52091 A | 2/2000 |
| JP | 2003-136248 A | 5/2003 |
| JP | 2006-46766 A | 2/2006 |
| JP | 2015-164735 A | 9/2015 |

OTHER PUBLICATIONS

The International Search Report for the corresponding international application No. PCT/JP2017/039488, dated Nov. 28, 2017.
The Office Action for the corresponding German application No. 11 2017 004 453.7, dated Dec. 13, 2021.

* cited by examiner

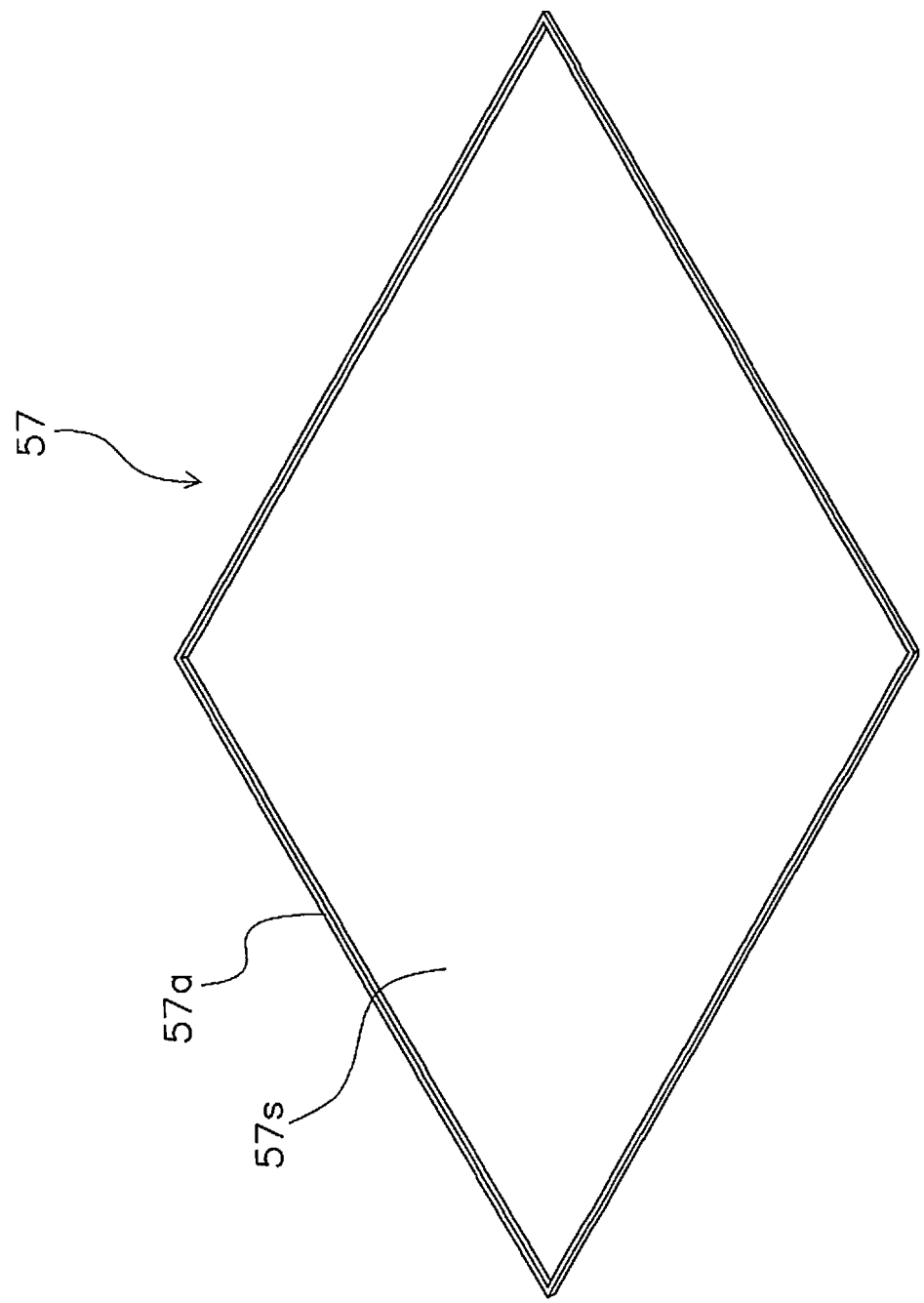

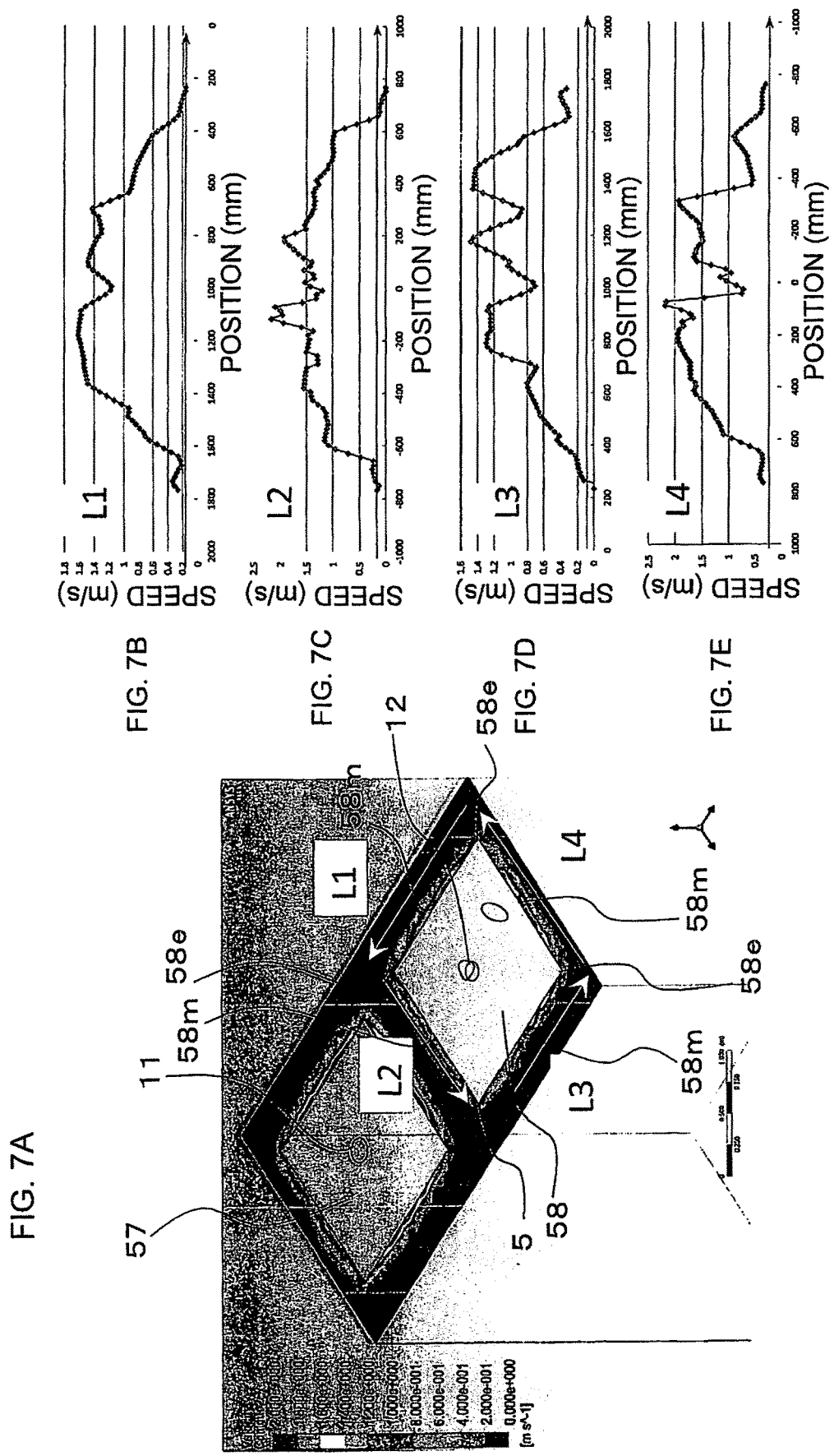

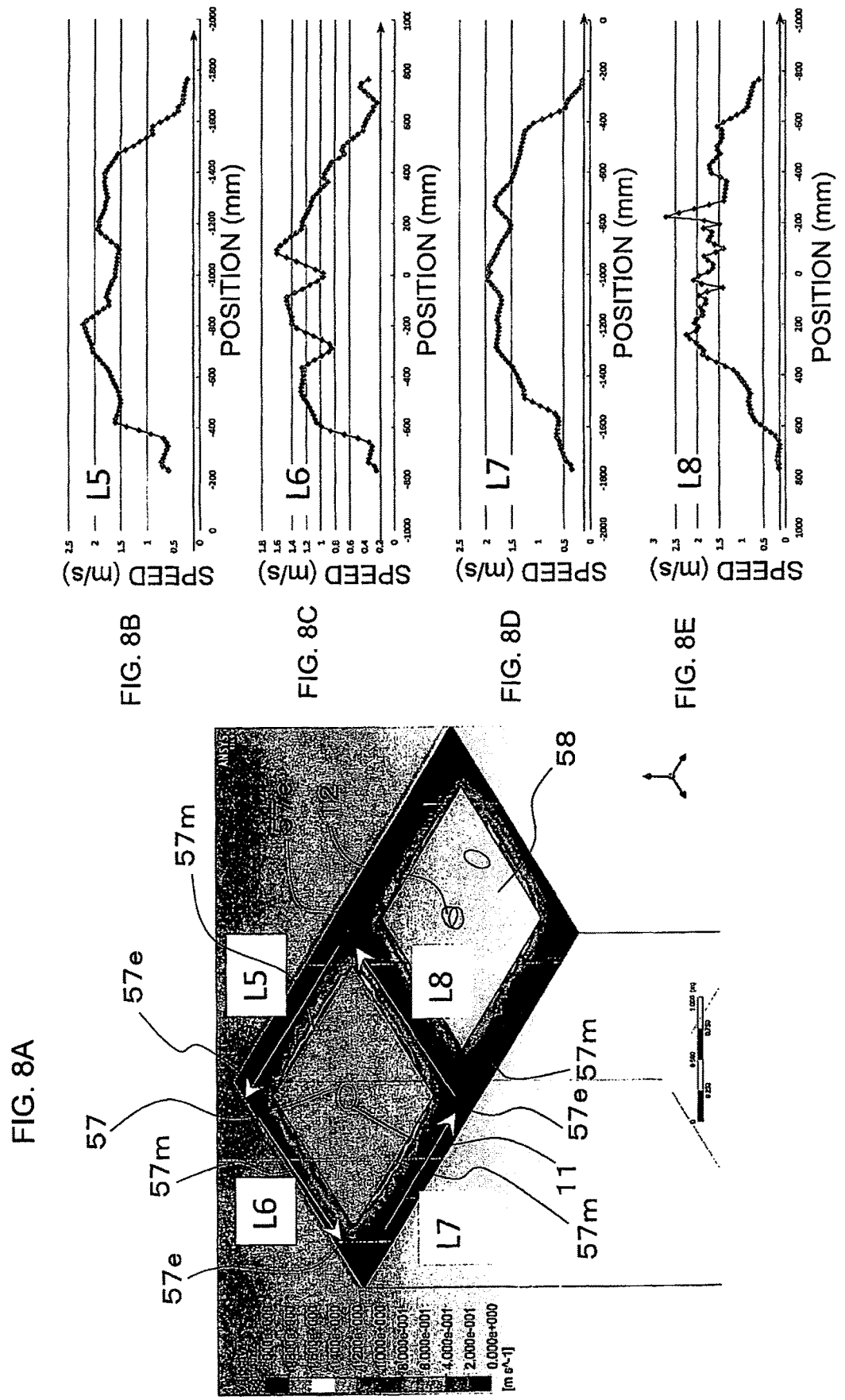

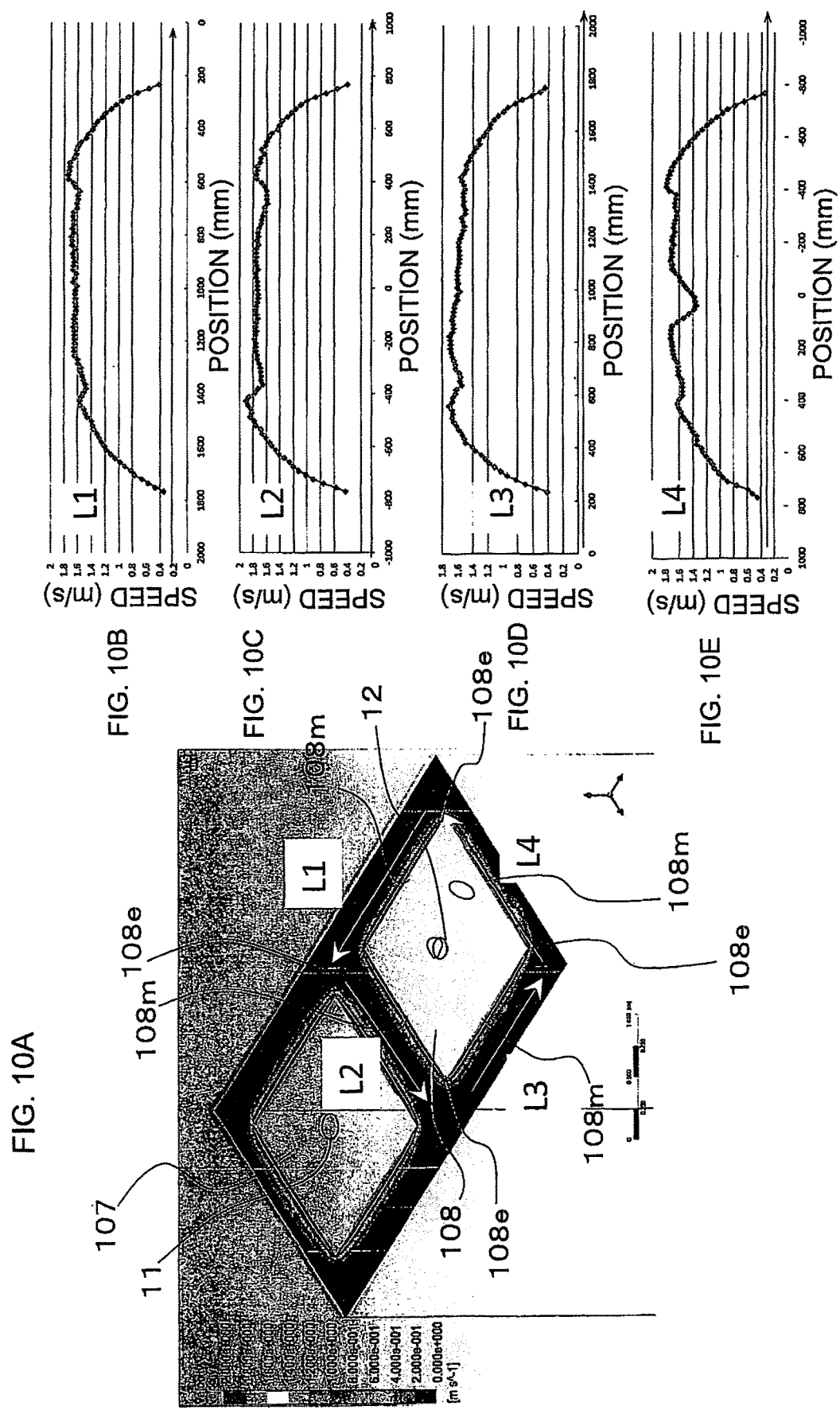

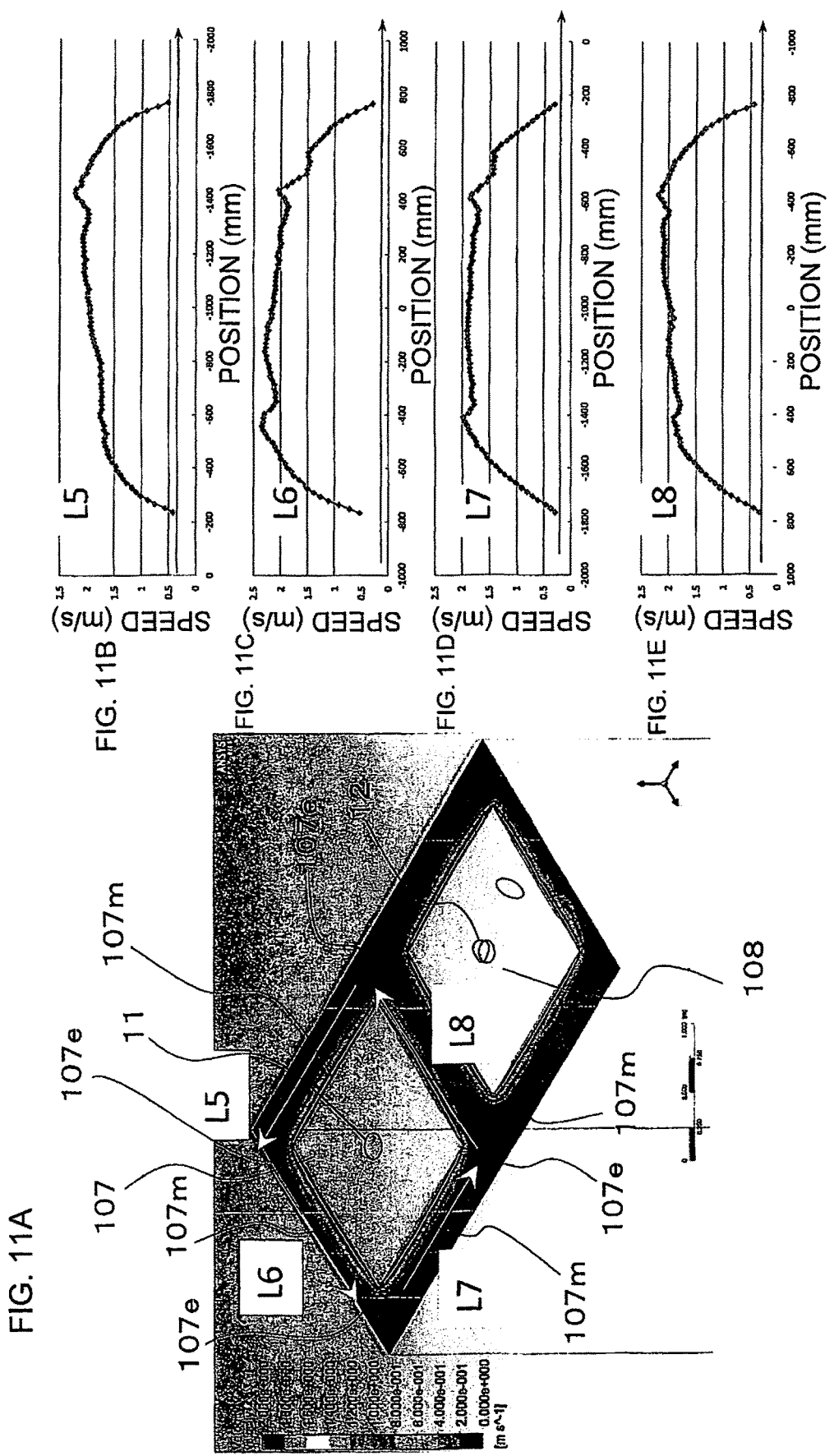

MACHINING ROOM

CROSS-REFERENCE TO RELATED APPLICATIONS

This application is a U.S. National stage application of International Application No. PCT/JP2017/039488, filed on Nov. 1, 2017. This U.S. National stage application claims priority under 35 U.S.C. § 119(a) to Japanese Patent Application No. 2016-219096, filed in Japan on Nov. 9, 2016, the entire contents of which are hereby incorporated herein by reference.

BACKGROUND

Field of the Invention

The present invention relates to a machining room in which a three-dimensional laser cutter is disposed.

Background Information

Conventionally, a two-dimensional laser cutter has been used for cutting and machining flat plates or the like. With a laser cutter, laser cutting is performed by melting a workpiece with a laser beam emitted from a laser head, and blowing away the molten metal with an assist gas. A large amount of dust is sprayed onto the back side of the workpiece being cut (the opposite side from the laser head), and the main component of this dust is a fine powder of iron oxide, which floats as an aerosol in the high-temperature assist gas jet.

For this reason, a two-dimensional laser cutter such as this is provided with a dust collection mechanism under the workpiece to be cut in order to collect dust (see JP-A 2003-136248).

Meanwhile, in recent years a three-dimensional laser cutter has been used in the cutting of a three-dimensional workpiece such as a stamped automobile body. A three-dimensional laser cutter has a mechanism with which a laser head that emits a laser beam can be moved in the XYZ direction and in the orientation axis direction of the laser head.

Such a three-dimensional laser cutter is installed in a machining room so as to block light so that the laser light does not leak out, and to collect dust generated by laser cutting so that it will not leak out. Regarding this light blocking, especially when using a fiber laser, the machining room is constructed to eliminate any gaps that would allow light leakage, so that not even faint light, such as scattered light, reflected light, or transmitted light, will leak out.

SUMMARY

However, when it comes to dust collection, this can be efficiently accomplished if a dust collection mechanism can be provided under the workpiece to be cut, as with a two-dimensional table type of laser cutter that cuts a flat plate as discussed in JP-A 2003-136248, but in the case of a three-dimensional laser cutter, it has been difficult to provide such a configuration.

That is, with a three-dimensional laser cutter, a stamping (the workpiece to be cut) is positioned and placed on a cutting table via a jig, but since stampings come in various shapes, it was impossible to provide a dust collection mechanism under the stamping.

In view of the above problems encountered in the past, it is an object of the present invention to provide a machining room with which dust can be removed with a simple mechanism.

The machining room according to the first aspect is a machining room in which a three-dimensional laser cutter is disposed, comprising a ceiling and a plate-like member. The ceiling is provided with a suction port connected to a suction device. The plate-like member is disposed below the ceiling with a gap therebetween, and forms a space between itself and the ceiling.

Thus forming a space produces an airflow toward the suction port in the space when the suction device is operated. Therefore, the smoke-like dust generated by the laser cutting rises and reaches the plate-like member, spreads out in all directions due to its buoyancy, and reaches the ends of the plate-like member, whereupon the smoke-like dust is removed by the airflow heading toward the suction port. This allows dust generated by laser cutting to be removed.

Therefore, it is possible to remove dust with a simple structure in which the plate-like member is disposed and the suction port is formed directly on the ceiling, without any hood or other such heavy piece being interposed.

The machining room according to the second aspect is the machining room according to the first aspect, wherein air in the machining room is sucked in from the suction port.

This allows dust and the like to be removed from the machining room.

The machining room according to the third aspect is the machining room according to the first aspect, wherein the suction device is a dust collector that collects dust in the machining room.

This allows dust and the like in the machining room to be removed and collected.

The machining room according to the fourth aspect is the machining room according to the first aspect, wherein an airflow toward the suction port is produced in the space.

This allows dust in the machining room to be sucked up efficiently.

The machining room according to the fifth aspect is the machining room according to the first aspect, wherein the size of a first region in which the plate-like member is disposed is greater than or equal to the size of a second region in which laser cutting is performed by the three-dimensional laser cutter. The first region is provided so as to cover the second region in plan view.

This allows dust that is raised by laser cutting to be removed so that as little as possible remains.

The machining room according to the sixth aspect is the machining room according to the fifth aspect, wherein a plurality of the plate-like members are disposed in the first region.

Since the shape of the cutting area (machining table) from which dust is raised is usually rectangular in plan view, it is difficult to equalize the surrounding suction air speed merely by providing a single plate-like member in the center of the ceiling, but providing a plurality of plate members affords better uniformity so that the airflow for collecting dust is not weaker in some locations.

The machining room according to the seventh aspect is the machining room according to the first aspect, wherein a plurality of suction ports are provided.

Since the shape of the cutting area (machining table) from which dust is raised is usually rectangular in plan view, it is difficult to equalize the surrounding suction air speed merely by providing a single suction port in the center of the ceiling, but providing a plurality of suction ports affords better uniformity so that the airflow for collecting dust is not weaker in some locations.

The machining room according to the eighth aspect is the machining room according to the seventh aspect, wherein a plurality of plate-like members are provided.

Since the shape of the cutting area (machining table) from which dust is raised is usually rectangular in plan view, it is difficult to equalize the surrounding suction air speed merely by providing a single plate-like member in the center of the ceiling, but providing a plurality of plate-like members affords better uniformity so that the airflow for collecting dust is not weaker in some locations.

The machining room according to the ninth aspect is the machining room according to the first aspect, further comprising side walls and a vent hole. The side walls support the ceiling. The vent hole is formed near the floor of the side wall.

Consequently, the airflow heading from the vent hole near the floor toward the space between the ceiling and the plate-like member is formed along the side wall in the machining room, so suction efficiency is improved.

The machining room according to the tenth aspect is the machining room according to the ninth aspect, further comprising a blocking component. The blocking component blocks the emission of scattered laser light from the vent hole to the outside.

This prevents scattered laser light from leaking to the outside of the machining room.

The machining room according to the eleventh aspect is the machining room according to the first aspect, wherein the suction port is disposed on the inside of the plate-like member in plan view.

Consequently, an airflow for sucking up dust is formed in the space formed between the plate-like member and the ceiling, and the dust is sucked into the suction port.

The machining room according to the twelfth aspect is the machining room according to the first aspect, wherein the plate-like member has a rectangular shape. The suction port is disposed at the center of the plate-like member in plan view. The plate-like member has first edge portions including the centers of the sides of the peripheral edges, and second edge portions including the corners of the peripheral edge. The gap between the first edge portions and the ceiling is narrower than the gap between the second edge portions and the ceiling.

Here, since the distance from the suction port to the corners of the plate-like member is longer than the distance from the suction port to the centers of the sides of the plate-like member, the airflow at the corners tends to be weaker. Therefore, by making the gap between the ceiling and the first edge portions be narrower than the gap between the ceiling and the second edge portions, an airflow is more readily produced between the second edge portions and the ceiling, and the difference in airflow depending on the position around the peripheral edge of the plate-like member can be reduced.

The present invention provides a machining room with which dust can be removed by a simple mechanism.

BRIEF DESCRIPTION OF DRAWINGS

FIG. 6A is an oblique view of a plate-like member in Embodiment 2 of the present invention;

FIGS. 7A to 7E are diagrams showing Working Example 1 in Embodiment 2 according to the present invention;

FIGS. 8A to 8E are diagrams showing Working Example 1 in Embodiment 2 according to the present invention;

FIGS. 10A to 10E are diagrams of Working Example 2 in Embodiment 3 according to the present invention;

FIGS. 11A to 11E are diagrams of Working Example 2 in Embodiment 3 according to the present invention.

DETAILED DESCRIPTION OF EMBODIMENT(S)

The machining room in an embodiment according to the present invention will be described below through reference to the drawings.

1. Embodiment 1

The machining room in Embodiment 1 according to the present invention will be described.

1-1. Configuration 1-1-1. Overview of Machining Room

Figure 1:
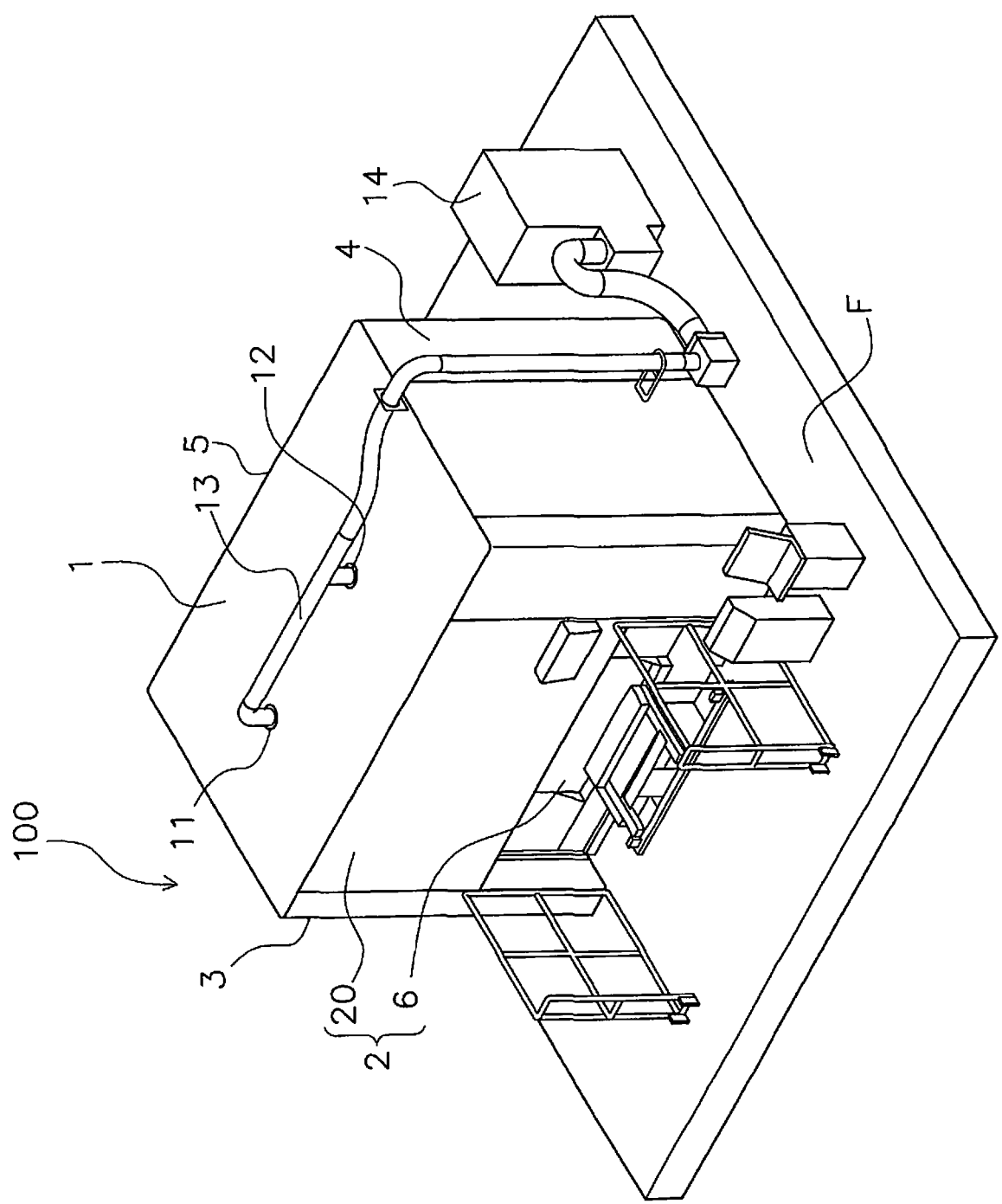
FIG. 1 is an oblique view of the machining room in Embodiment 1 of the present invention.

FIG. 1 is an external view of a machining room 100 in this embodiment.

As shown in the drawings, the machining room 100 has is substantially cuboid in shape, and houses a three-dimensional laser cutter 200 (see FIG. 2; described below). The machining room 100 has a ceiling 1, a front side wall 2, a left side wall 3, a right side wall 4, a rear side wall 5, plate-like members 7 and 8 (see FIG. 2), a vent port 9, and a blocking component 10 (see FIG. 2).

The ceiling 1 is supported by the front side wall 2, the left side wall 3, the right side wall 4, and the rear side wall 5. More precisely, as will be described below, Dust collection ports 11 and 12 formed in the ceiling 1 for sucking up dust generated by laser cutting.

The front side wall 2 has a side wall portion 20 and a turntable 6. The side wall portion 20 has an opening in the lower portion, and the turntable 6 is disposed in this opening. The turntable 6 moves the workpiece into the machining room 100 by being rotated after the workpiece to be cut by laser has been placed on it. A partition wall is provided in the center of the turntable 6, and along with the side wall portion 20 constitutes a wall face that blocks off the machining room 100 from the outside.

The left side wall 3 and the right side wall 4 are disposed opposite each other on the left and right when the front side wall 2 is viewed from the front. The rear side wall 5 is disposed opposite the front side wall 2.

Figure 2:
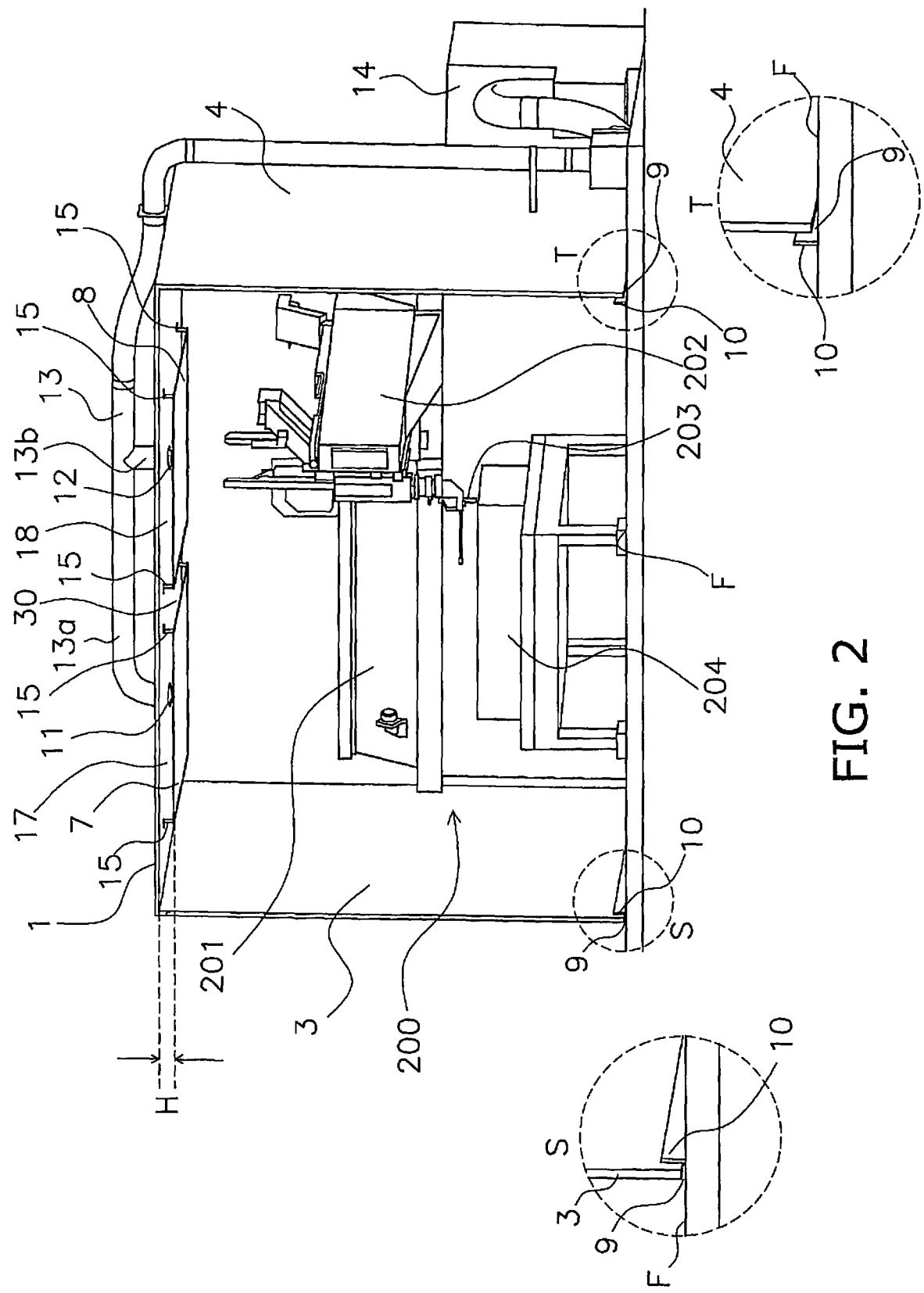
FIG. 2 is an oblique view of the interior of the machining room in FIG. 1.

FIG. 2 is an oblique view of the machining room 100, from which the front side wall 2 has been removed. As shown in the drawing, the three-dimensional laser cutter 200 has a support unit 201 disposed on the rear side wall 5 side, an arm unit 202 provided so as to project from the support unit 201 toward the turntable 6 side, and a laser head 203 disposed at the distal end of the arm unit 202.

A machining table 204 on which a workpiece is placed via a jig is disposed in the approximate center of the machining room 100 and below the laser head 203.

1-1-2. Dust Collection Ports

Figure 3:
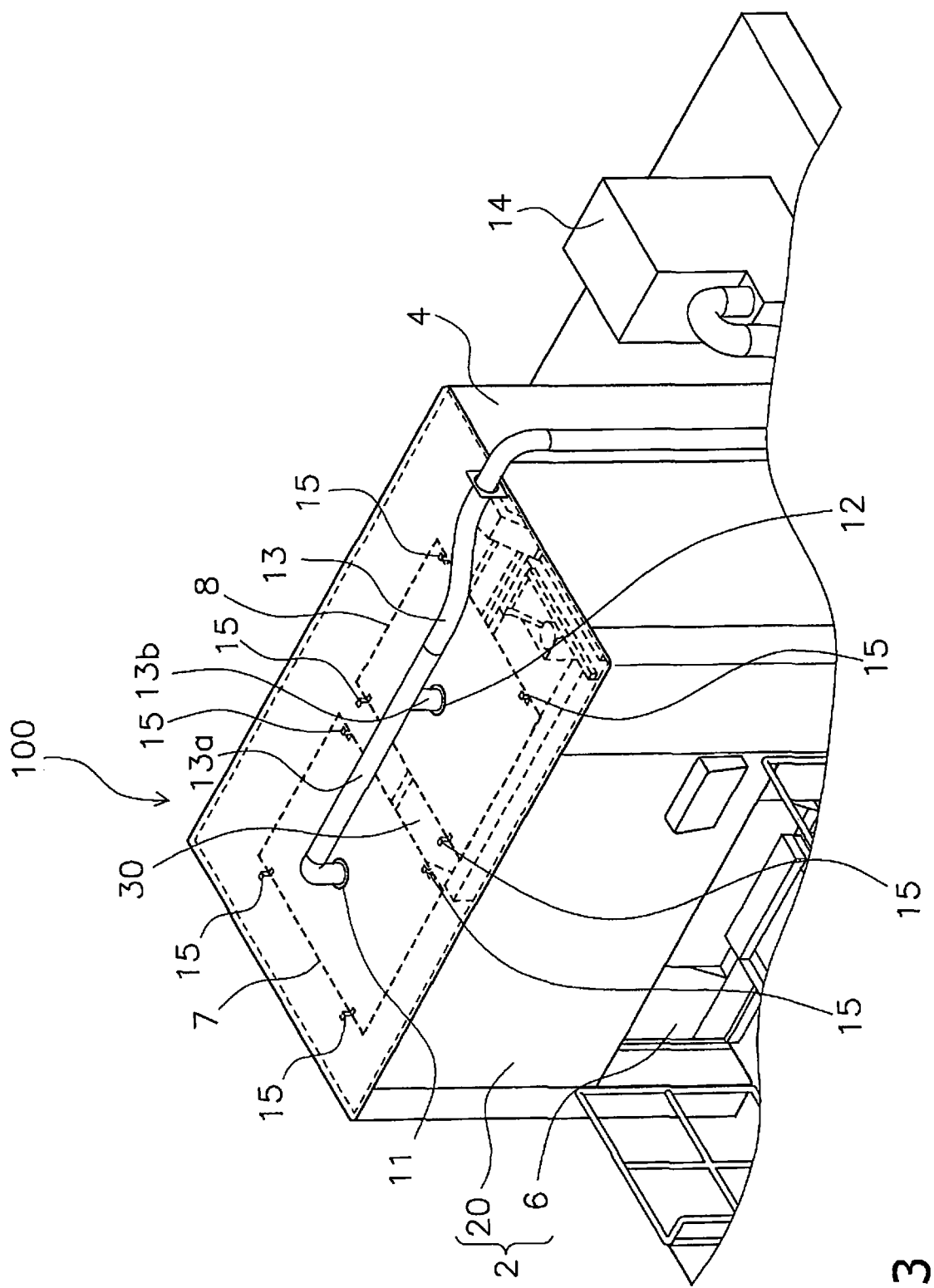
FIG. 3 is an oblique view illustrating the configuration of the ceiling in the machining room of FIG. 1.

FIG. 3 is an oblique view of the internal configuration.

As shown in FIGS. 2 and 3, the ceiling 1 has two dust collection ports 11 and 12 formed along the disposition direction of the left side wall 3 and the right side wall 4. The dust collection port 11 is provided on the left side wall 3 side, and the dust collection port 12 is provided on the right side wall 4 side. Dust collection ducts 13 disposed on the upper side of the ceiling 1 are connected to the dust collection ports 11 and 12. The dust collection duct 13 extends downward from the right side wall 4 side and is connected to a dust collector 14 disposed on the floor F. More precisely, the distal end of the dust collection duct 13 on the side of the dust collection ports 11 and 12 branches into a duct portion 13a connected to the dust collection port 11, and a duct portion 13b connected to the dust collection port 12. Also, the distance to the dust collector 14 is shorter on the dust collection port 12 side than on the dust collection port 11 side.

1-1-3. Plate-Like Members

The plate-like members 7 and 8 are flat plates made from plastic or the like, and are disposed on the lower side of the ceiling 1. The plate-like members 7 and 8 are square in shape and are fixed to the ceiling 1 by four brackets 15 as shown in FIG. 3. The plate-like members 7 and 8 are disposed side by side along the disposition direction of the left side wall 3 and the right side wall 4, and are disposed such that their sides are parallel to the sides of the rectangular ceiling 1. A specific gap 30 is formed between the plate-like member 7 and the plate-like member 8, which are disposed adjacent to each other.

Figure 4:
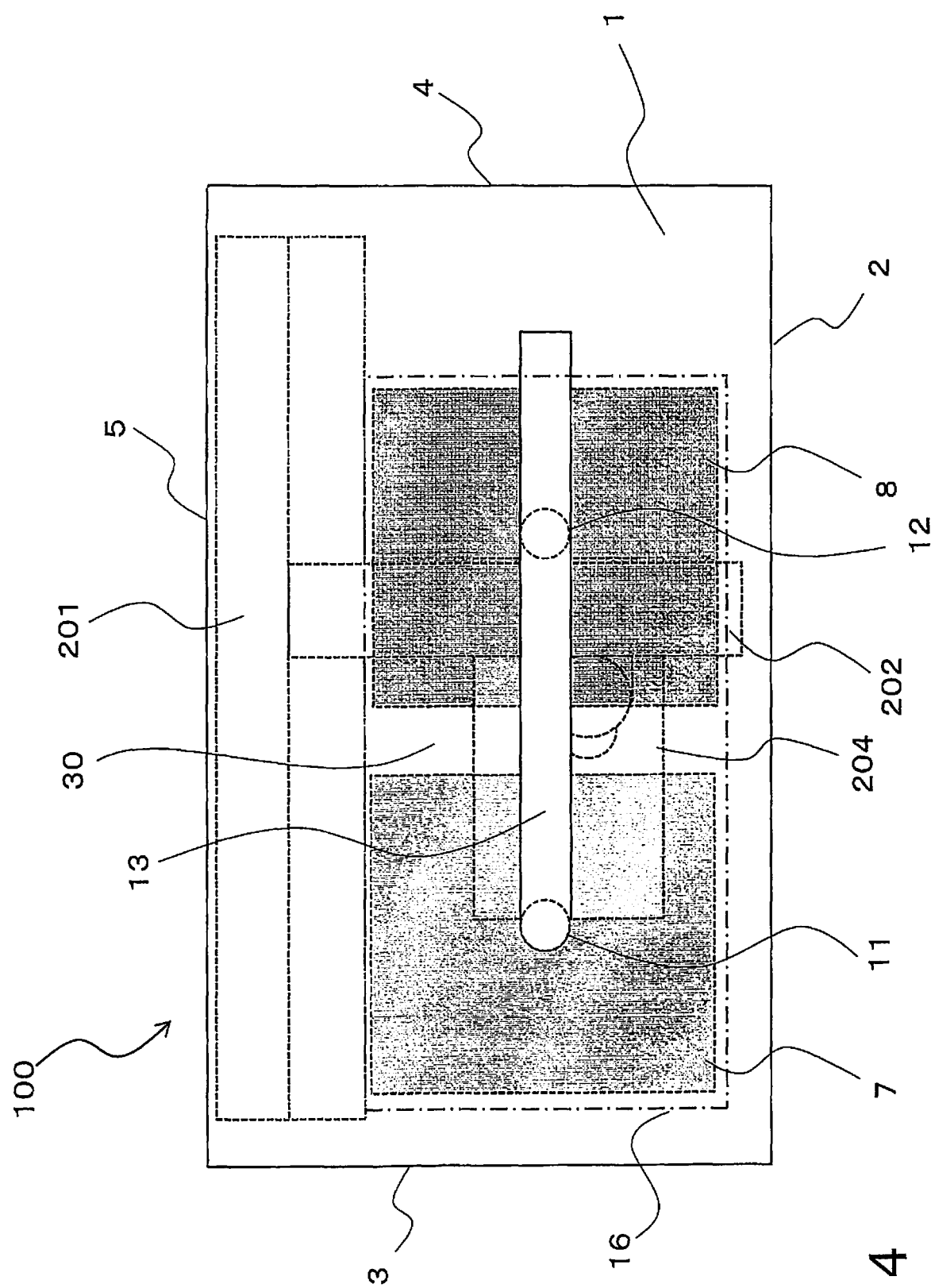
FIG. 4 is a simplified plan view of the internal configuration of the machining room in FIG. 1.

FIG. 4 is a simplified plan view of the arrangement relationship between the plate-like members 7 and 8 and the dust collection ports 11 and 12. In plan view, the dust collection port 11 is disposed inside the plate-like member 7 and at the center of the plate-like member 7. The dust collection port 12 is disposed inside the plate-like member 8 and at the center of the plate-like member 8.

Also, an area 16 (indicated by the one-dot chain line in FIG. 4) in which the plate-like members 7 and 8 are disposed covers the machining table 204 in plan view, and is formed wider than the machining table 204. The area 16 is an area that conforms to the outer shape of the plate-like members 7 and 8, and includes the plate-like member 7, the plate-like member 8, and the gap 30 between the adjacent plate-like members 7 and 8.

As shown in FIG. 2, spaces 17 and 18 are formed between the plate-like members 7 and 8 and the ceiling 1. The space 17 constitutes a dust collection passage through which dust moves toward the dust collection port 11 when the dust collector 14 is actuated. The space 18 constitutes a dust collection passage through which dust moves towards the dust collection port 12 when the dust collector 14 is actuated.

The gap H between the plate-like members 7 and 8 and the ceiling 1 (also referred to as the height of the spaces 17 and 18) is determined by the flow rate to the spaces 17 and 18 and the length of the sides of the plate-like members 7 and 8 to be installed.

1-1-4. Vent Hole, Blocking Component

The vent holes 9 are openings formed near the floor F of the turntable 6, the left side wall 3, the right side wall 4, and the rear side wall 5. As the air in the machining room 100 is drawn through the dust collection ports 11 and 12 by the dust collector 14, the outside air is drawn in through the vent holes 9. The blocking component 10 blocks the laser light so that it does not leak out from the vent holes 9.

The detail view of the S portion in FIG. 2 shows the vicinity of the lower end of the left side wall 3. The detail view of the T portion in FIG. 2 shows the vicinity of the lower end of the right side wall 4. Referring to the detail view of the S portion, the vent hole 9 is formed at the lower end of the left side wall 3. The blocking component 10 is a wall formed on the inside of the vent holes 9, and is formed to be taller than the height of the vent hole 9. A labyrinth structure is formed by these blocking components 10, and they block the laser light from leaking out through the vent holes 9. Similarly, in the detail view of the T portion, the vent hole 9 is formed at the lower end of the right side wall 4, and the blocking component 10 is provided on the inside thereof.

Figure 5A:
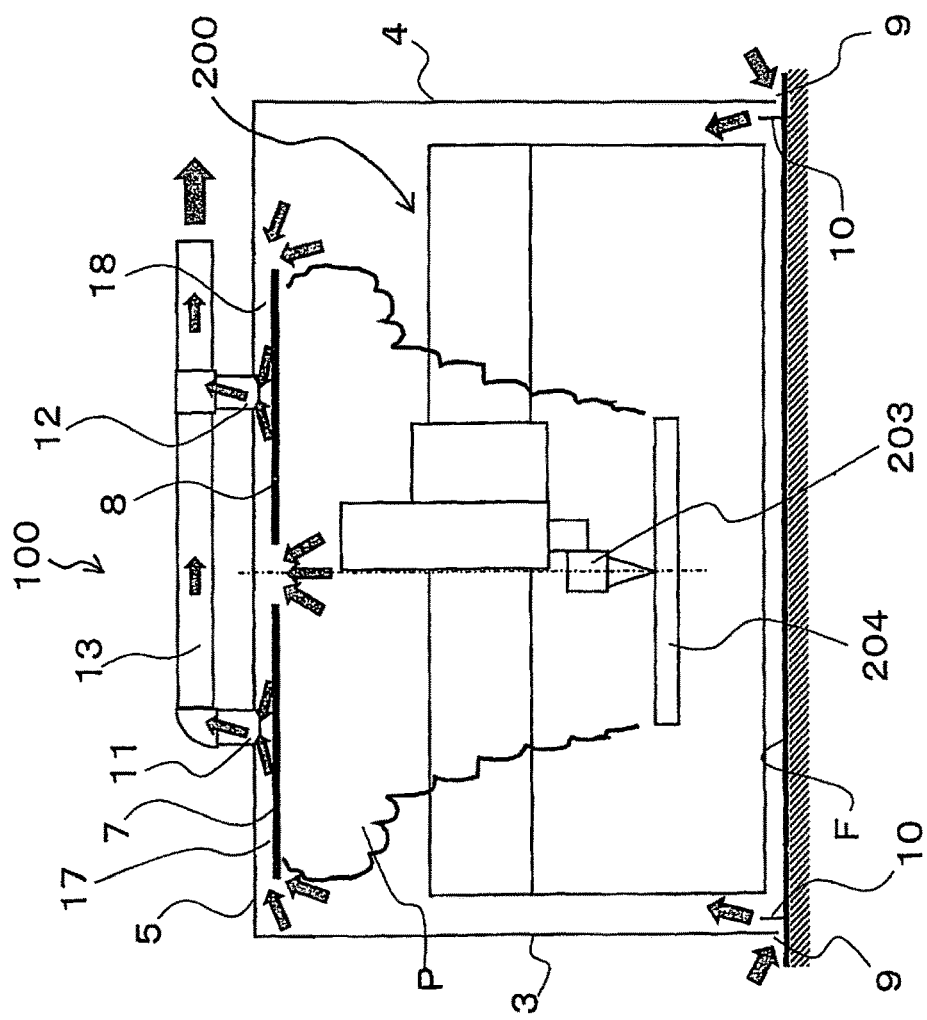
FIG. 5A is a simplified left side view of the internal configuration of the machining room in FIG. 1.

As shown in FIG. 5A (discussed below), a vent hole 9 is formed at the lower end of the turntable 6, and a blocking component 10 is provided on the inside thereof. Also, a vent hole 9 is formed at the lower end of the rear side wall 5, and a blocking component 10 is provided on the inside thereof. The heights of the blocking components 10 of the turntable 6, the left side wall 3, the right side wall 4, and the rear side wall 5 are higher than the height of the vent holes 9.

1-2. Operation

Figure 5B:
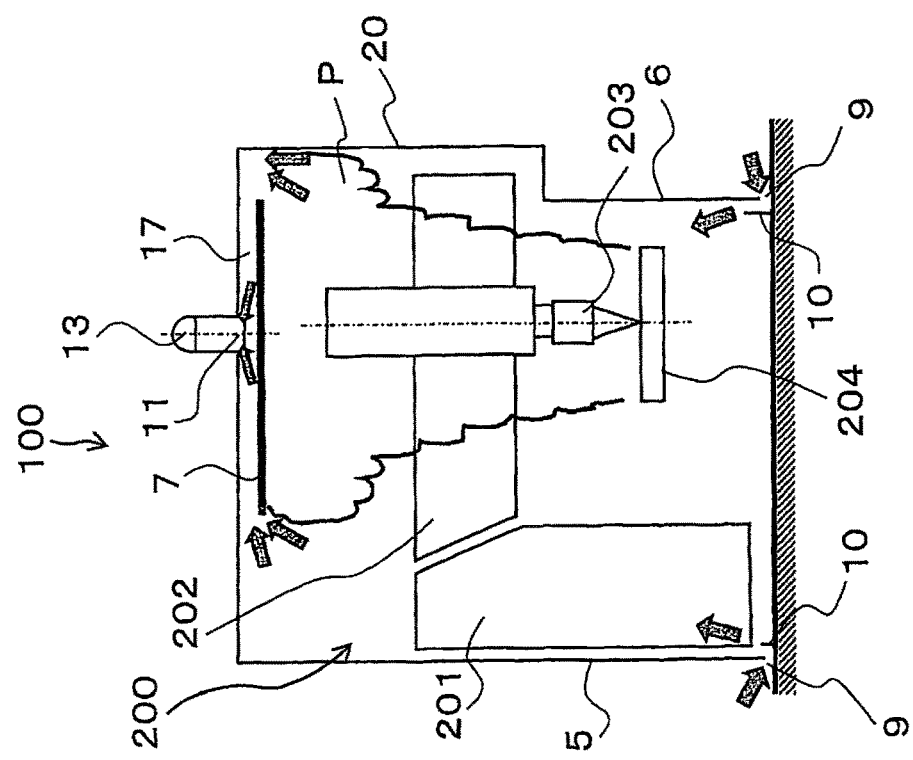
FIG. 5B is a simplified front view of the internal configuration of the machining room in FIG. 1.

FIG. 5A is a simplified left side view for illustrating the dust collection operation, and FIG. 5B is a simplified front view for illustrating the dust collection operation.

When the dust collector 14 is actuated, outside air is drawn in from the vent holes 9, and as shown in FIGS. 5A and 5B, around the plate-like members 7 and 8 is generated a dust collection airflow that is headed toward the dust collector 14 via the dust collection ports 11 and 12 and the spaces 17 and 18 between the plate-like members 7 and 8 and the ceiling 1 (see the arrow in the figure). Also, an airflow going from the vent holes 9 near the floor F toward the spaces 17 and 18 formed by the plate-like members 7 and 8 is formed along the side walls of the machining room 100 (the front side wall 2, the left side wall 3, the right side wall 4, and the rear side wall 5).

When the workpiece is cut with the three-dimensional laser cutter 200, smoke-like dust P generated by the laser cutting rises up and reaches the plate-like members 7 and 8. The dust that reaches the plate-like members 7 and 8 spreads out by buoyancy to the four edges of the plate-like members 7 and 8. When the dust reaches the edges of the plate-like members 7 and 8, it is collected by the dust collection airflow and is sucked into the dust collection ports 11 and 12 through the spaces 17 and 18.

2. Embodiment 2

Next, the machining room 100 in Embodiment 2 according to the present invention will be described. The shape of the edges of the plate-like members 7 and 8 of the machining room in Embodiment 2 is different from that in Embodiment 1. Therefore, the description will focus on this difference.

2-1. Configuration

Figure 6B:
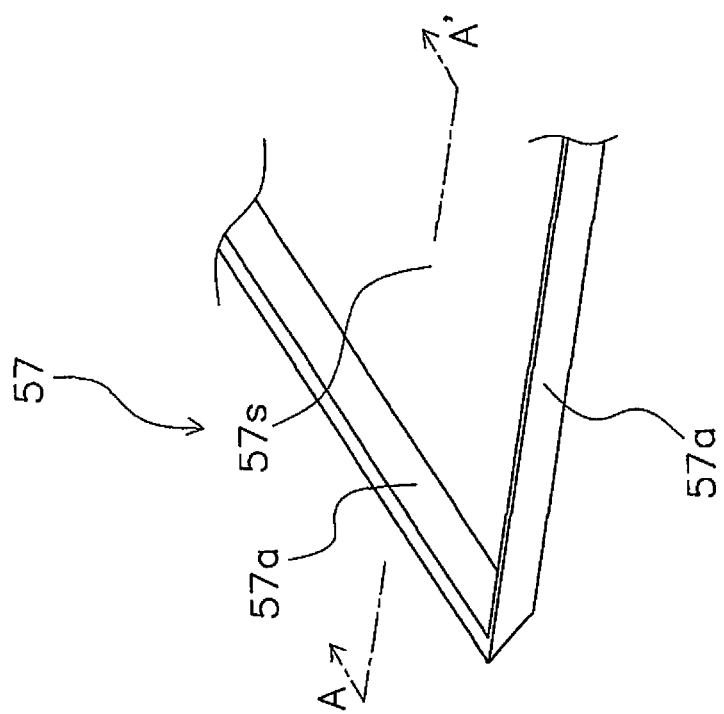
FIG. 6B is a detail view of the plate-like member in FIG. 6A.
Figure 6C:
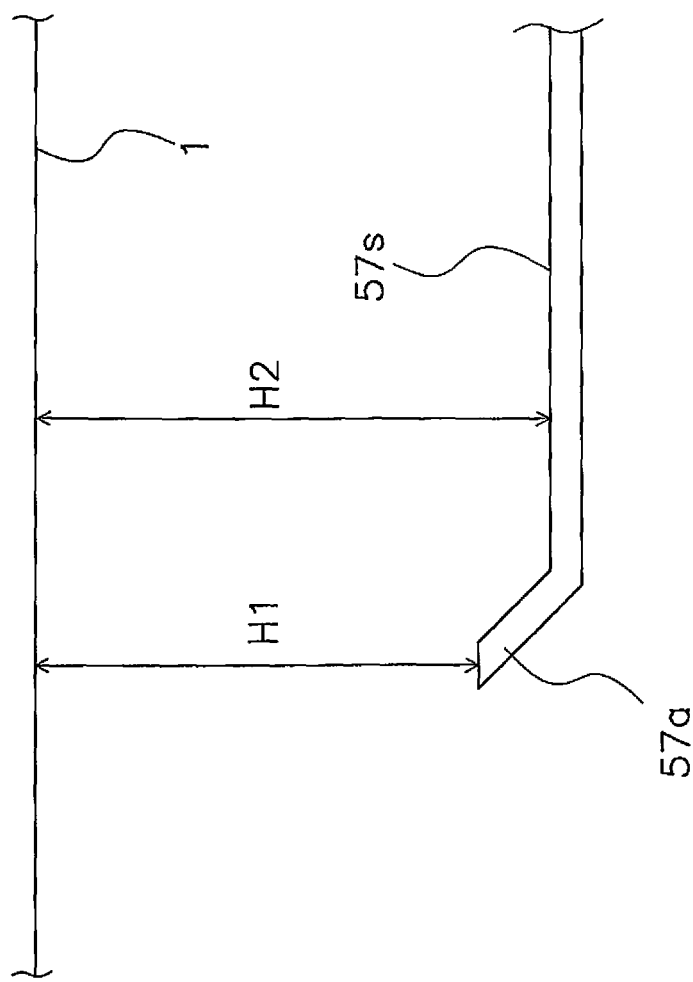
FIG. 6C is a cross section along the A-A' line in FIG. 6B.

Since a plate-like member 57 and a plate-like member 58 have the same shape, just the plate-like member 57 will be described here. FIG. 6A is an oblique view of the plate-like member 57 of Embodiment 2. FIG. 6B is a detail view of FIG. 6A. FIG. 6C is a cross section along the A-A' line in FIG. 6B.

With the plate-like member 7 in Embodiment 1, the edges are not folded back, but the edges of the plate-like member 57 in Embodiment 2 are folded back toward the ceiling 1 all the way around the circumference. The plate-like member 57 has a main face 57s and edges 57a. The main face 57s is disposed substantially parallel to the ceiling 1. The edges 57a are formed to be inclined from the main face 57s toward the ceiling 1.

2-2. Working Example 1

Embodiment 2 will now be described in further detail by using Working Example 1.

As one example, the plate-like members 57 and 58 have a square shape measuring 1500 mm along one side in plan view. The gaps (see H1 and H2 shown in FIG. 6C) from the ceiling 1 are set such that H1 is 43.2 mm and H2 is 50 mm. H1 indicates the distance from the distal ends of the edges 57a, which are the portions that are folded back, to the ceiling 1 and H2 indicates the distance from the main face 57s to the ceiling 1.

FIGS. 7A-7E and 8A-8E show the flow rates at the peripheral edges of the plate-like members 57 and 58 when suction is applied at 80 m³/min by the dust collector 14.

The flow rates at the sides L1, L2, L3, and L4 of the plate-like member 58 shown in FIG. 7A are shown in FIGS. 7B to 7E, respectively. FIGS. 8B to 8E show the flow rates at the sides L5, L6, L7, and L8 of the plate-like member 57 shown in FIG. 8A.

As shown in FIGS. 7A-7E and 8A-8E, it can be seen that a speed of 1 m/s or higher can be ensured at the center of each of the sides L1 to L8. This allows the dust generated by laser cutting to be collected. Here, 1 m/s is called the control air speed, which is the minimum speed for efficiently collecting dust.

It can also be seen that the flow rates at the centers 57m and 58m of the sides L1 to L8 are higher than those at the ends of the sides L1 to L8 (which can also be said to be near the corners 57e and 58e). The reason for this is believed to be that the distances from the dust collection ports 11 and 12 are closer at the centers 57m and 58m of the sides than at the ends (the corners 57e and 58e).

3. Embodiment 3

The machining room 100 in Embodiment 3 according to the present invention will now be described. The machining room of Embodiment 3 differs from Embodiment 1 in the shape of the plate-like members 7 and 8. Therefore, the description will focus on this difference.

3-1. Configuration

Since the plate-like member 107 and the plate-like member 108 have the same shape, just the plate-like member 107 will be used in the description.

Figure 9A:
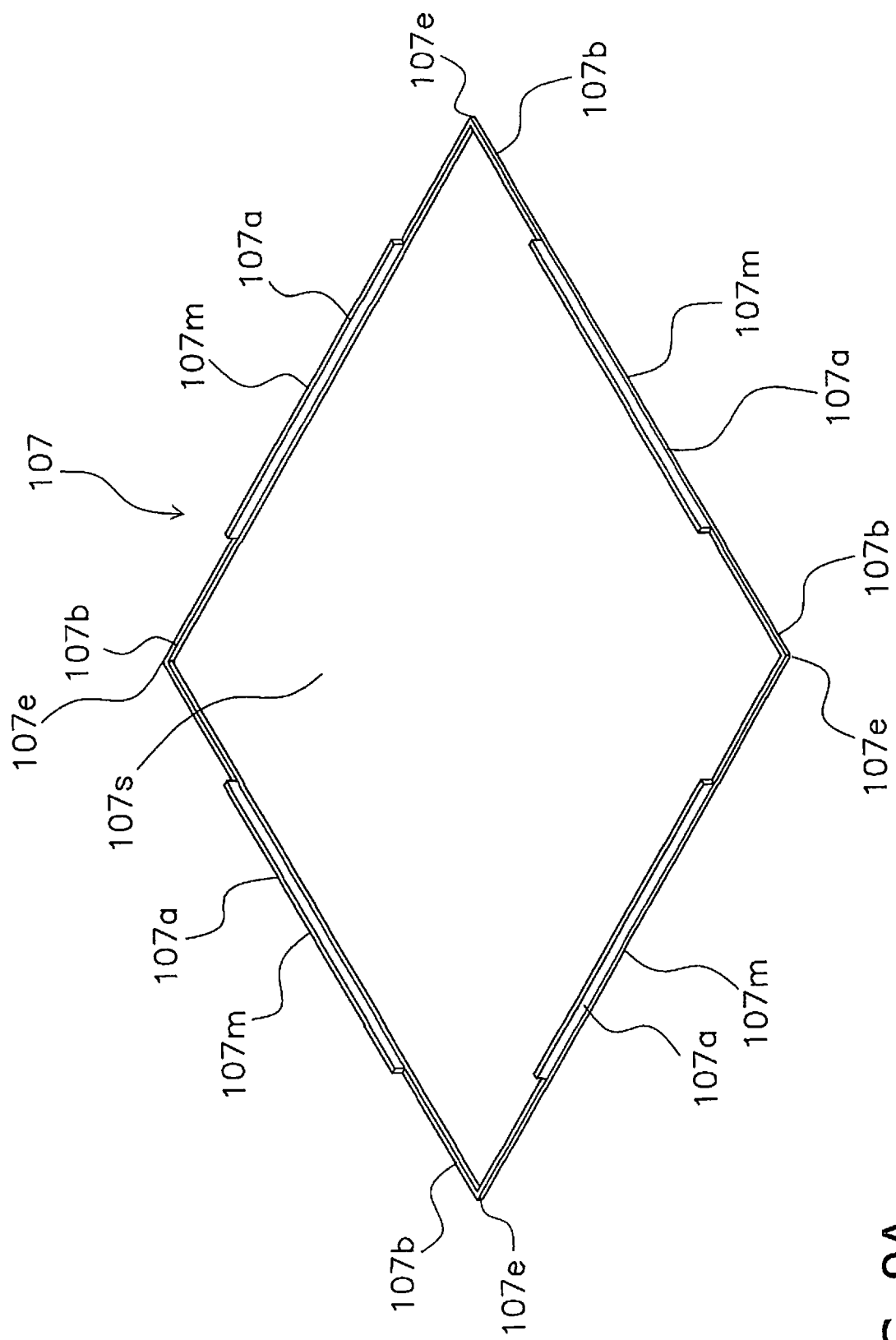
FIG. 9A is an oblique view of a plate-like member in Embodiment 2 according to the present invention.
Figure 9B:
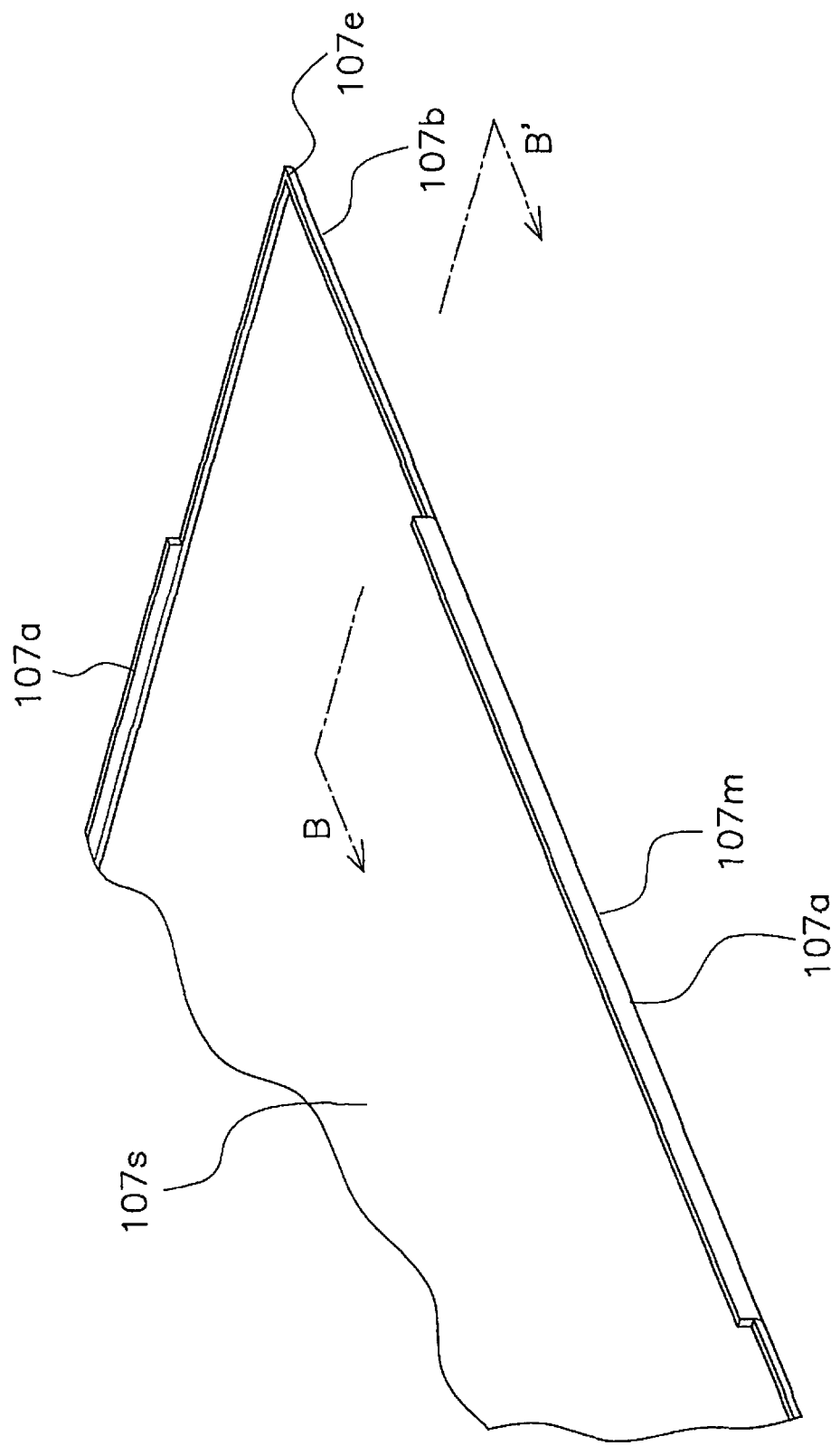
FIG. 9B is a detail view of the plate-like member in FIG. 9A.
Figure 9C:
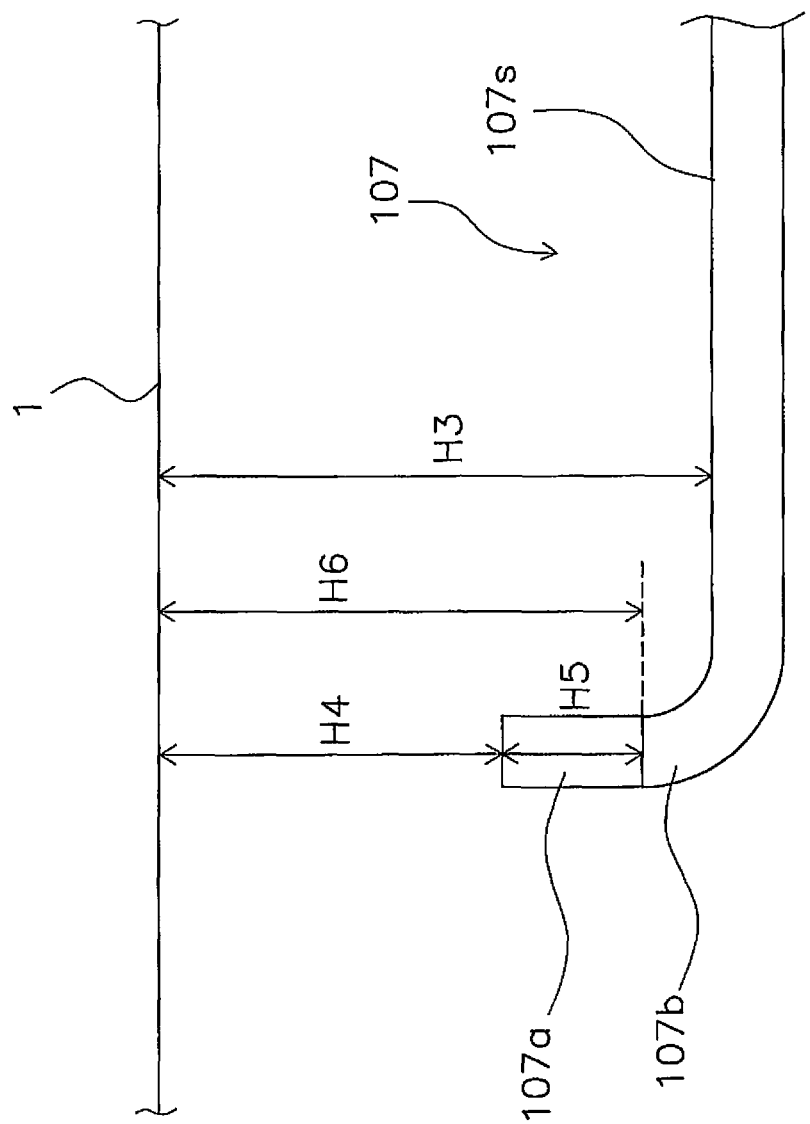
FIG. 9C is a cross section along the B-B' line in FIG. 9B.

FIG. 9A is an oblique view of the plate-like member 107 in Embodiment 3. FIG. 9B is a detail view of FIG. 9A. FIG. 9C is a cross section along the B-B' line in FIG. 9B.

As shown in FIGS. 9A, 9B, and 9C, the plate-like member 107 of Embodiment 3 has first edge portions 107a that include the centers 107m of the sides, and second edge portions 107b that include the corners 107e. The entire peripheral edge of the plate-like member 107 is formed with radius with respect to the main face 107s and is folded back toward the ceiling 1, but the first edge portions 107a protrude above the second edge portions 107b.

As a result, the gap H4 between the first edge portions 107a and the ceiling 1 is narrower than the gap H6 (=H4+H5) between the second edge portions 107b and the ceiling 1. H5 indicates the difference in height between the first edge portions 107a and the second edge portions 107b. For this reason, it is more difficult for gas to flow into the gap H4 than into the gap H6, but as described in Working Example 1, the flow rate is lower at the ends of the sides (the corners 107e and 108e) than in the centers due to the distance from the dust collection ports 11 and 12, it is possible to reduce the difference in the flow rates between the ends of the sides (the corners 107e) and the centers 107m.

Therefore, the flow rates from the periphery of the plate-like members 107 and 108 toward the dust collection ports 11 and 12 can be made uniform all the way around the circumference, so dust that has risen to the ceiling 1 can be collected, leaving behind as little as possible.

3-2. Working Example 2

Next, Embodiment 2 will be described in further detail using Working Example 2.

As an example, the plate-like members 107 and 108 have a square shape measuring 1500 mm along one side in plan view. H4 shown in FIG. 9C is set to 35 mm, H5 to 10 mm, H6 to 45 mm, and H3 to 50 mm.

FIGS. 10A-10E and 11A-11E show the flow rates at the peripheral edges of the plate-like members 107 and 108 when suction is applied at 80 m³/min by the dust collector 14.

The flow rates at the sides L1, L2, L3, and L4 of the plate-like member 108 shown in FIG. 10A are shown in FIGS. 10B to 10E, respectively. The flow rates at the sides L5, L6, L7, and L8 of the plate-like member 107 shown in FIG. 11A are shown in FIGS. 11B to 11E, respectively.

As shown in FIGS. 10A-10E and 11A-11E, forming the first edge portions 107a that protrude upward causes the flow at the centers of the sides to be directed toward the ends (corners), and it can be seen that the flow rate at the ends (corners) of the sides L1 to L8 of the plate-like members 107 and 108 decreases less than in Working Example 1.

In addition, forming the first edge portions 107a prevents the backflow of air that has flowed in between the plate-like members 107 and 108 and the ceiling 1, equalizes the speed at the center portions (the first edge portions 107a and 108a), and ensures a speed of about 1.6 m/s.

4. Features

4-1

The machining room 100 in Embodiments 1 to 3 is a machining room in which the three-dimensional laser cutter 200 is disposed, and comprises the ceiling 1 and the plate-like members 7 and 8, 57 and 58, or 107 and 108. The ceiling 1 is provided with the dust collection ports 11 and 12 (an example of a suction port) to which the dust collector 14 (an example of a suction device) is connected. The plate-like members 7 and 8, 57 and 58, or 107 and 108 are disposed below the ceiling 1 with a space therebetween, and form the spaces 17 and 18 between the ceiling 1 and themselves.

Thus forming the spaces 17 and 18 produces an airflow toward the dust collection ports 11 and 12 in the spaces 17 and 18 when the dust collector 14 is actuated. Therefore, when the smoke-like dust generated by laser cutting rises up and reaches the plate-like members 7 and 8, 57 and 58, or 107 and 108, and spreads out in all directions due to buoyancy and reaches the ends of the plate-like members 7 and 8, 57 and 58, or 107 and 108, dust is trapped by the airflow heading toward the dust collection ports 11 and 12. In this manner, dust generated by laser cutting can be collected.

Therefore, dust can be collected with a simple configuration in which the dust collection ports 11 and 12 are formed directly in the ceiling 1 and the plate-like members 7 and 8, 57 and 58, or 107 and 108 are disposed without any hood or other such heavy piece being interposed.

4-2

With the machining room 100 in Embodiments 1 to 3, the air in the machining room 100 is sucked out through the dust collection ports 11 and 12 (an example of a suction port).

This allows dust and the like can be removed from the machining room 100.

4-3

With the machining room 100 in Embodiments 1 to 3, an airflow going toward the dust collection ports 11 and 12 (an example of a suction port) is generated in the spaces 17 and 18.

This allows dust in the machining room 100 to be sucked up efficiently.

4-4

With the machining room 100 in Embodiments 1 to 3, the size of the area 16 (an example of a first area) in which the plate-like members 7 and 8, 57 and 58, or 107 and 108 are disposed is greater than or equal to the size of the machining table 204 (an example of a second area) on which laser cutting is performed by the three-dimensional laser cutter 200. The area 16 is provided so as to cover the machining table 204 in plan view.

As a result, dust that is raised by laser cutting can be trapped, leaving behind as little as possible.

4-5

With the machining room 100 in Embodiments 1 to 3, a plurality of the plate-like members 7 and 8, 57 and 58, or 107 and 108 are disposed in the area 16 (an example of a first area).

Since the shape of the cutting area (machining table) from which dust is raised is usually rectangular in plan view, it is difficult to equalize the surrounding suction air speed merely by providing a single plate-like member in the center of the ceiling 1, but providing a plurality of plate members affords better uniformity so that the airflow for collecting dust is not weaker in some locations.

4-6

With the machining room 100 in Embodiments 1 to 3, a plurality of dust collection ports 11 and 12 (an example of a suction port) are provided.

Since the shape of the cutting area (machining table) from which dust is raised is usually rectangular in plan view, it is difficult to equalize the surrounding suction air speed merely by providing a single suction port in the center of the ceiling 1, but providing a plurality of suction ports affords better uniformity so that the airflow for collecting dust is not weaker in some locations.

4-7

With the machining room 100 in Embodiments 1 to 3, a plurality of plate-like members 7 and 8, 57 and 58, or 107 and 108 are provided.

Since the shape of the cutting area (machining table) from which dust is raised is usually rectangular in plan view, it is difficult to equalize the surrounding suction air speed merely by providing a single plate-like member in the center of the ceiling 1, but providing a plurality of plate-like members affords better uniformity so that the airflow for collecting dust is not weaker in some locations.

4-8

The machining room 100 in Embodiments 1 to 3 further comprises the vent holes 9, the front side wall 2 (an example of a side wall), the left side wall 3 (an example of a side wall), the right side wall 4 (an example of a side wall), and the rear side wall 5 (an example of a side wall). The front side wall 2, the left side wall 3, the right side wall 4, and the rear side wall 5 support the ceiling 1. The vent holes 9 are formed near the floor F of the front side wall 2, the left side wall 3, the right side wall 4, and the rear side wall 5. The blocking components 10 block the emission of scattered laser light from the vent holes 9 to the outside.

Consequently, since an airflow going from the vent holes 9 near the floor F toward the space between the ceiling 1 and the plate-like members 7 and 8, 57 and 58, or 107 and 108 is formed along the side walls inside the machining room 100, collecting efficiency improves.

4-9

The machining room 100 in Embodiments 1 to 3 further comprises the blocking component 10. The blocking component 10 block the emission of scattered laser light from the vent hole 9 to the outside.

This prevents the scattered laser light from leaking to the outside of the machining room 100.

4-10

With the machining room 100 in Embodiments 1 to 3, the dust collection port 11 (an example of a suction port) is disposed on the inside of the plate-like member 7 or 107 in plan view, and the dust collection port 12 (an example of a suction port) is disposed inside the plate-like member 8 or 108 in plan view.

As a result, a dust collection airflow is formed in the spaces 17 and 18 formed between the plate-like members 7 and 8, 57 and 58, or 107 and 108 and the ceiling 1, and dust is collected by the dust collection ports 11 and 12.

4-11

With the machining room 100 in Embodiment 3, the plate-like members 107 and 108 are rectangular. In plan view, the dust collection ports 11 and 12 (an example of a suction port) are disposed at the centers of the plate-like members 107 and 108. The plate-like members 107 and 108 have the first edge portions 107a and 108a that include the centers 107m and 108m of the peripheral edges, and the second edge portions 107b and 108b that include the corners 107e and 108e of the peripheral edges. The gap L1 between the first edge portions 107a and 108a and the ceiling 1 is narrower than the gap L2 between the second edge portions 107b and 108b and the ceiling 1.

Here, the distance from the dust collection ports 11 and 12 to the corners 107e and 108e of the plate-like members 107 and 108 is longer than the distance from the dust collection ports 11 and 12 to the centers 107m and 108m of the sides of the plate-like members 107 and 108, so the air flow tends to be weaker at the corners. Therefore, making the gap L1 between the first edge portions 107a and 108a and the ceiling 1 narrower than the gap L2 between the second edge portions 107b and 108b and the ceiling 1 tends to produce an airflow between the second edge portions 107b and 108b and the ceiling 1, and the difference in airflow caused by the positions of the peripheral edges of the plate-like members 107 and 108 can be reduced.

5. Other Embodiments

Embodiments of the present invention were described above, but the present invention is not limited to or by the above embodiments, and various modifications are possible without departing from the gist of the invention.

(A)

Figure 12:
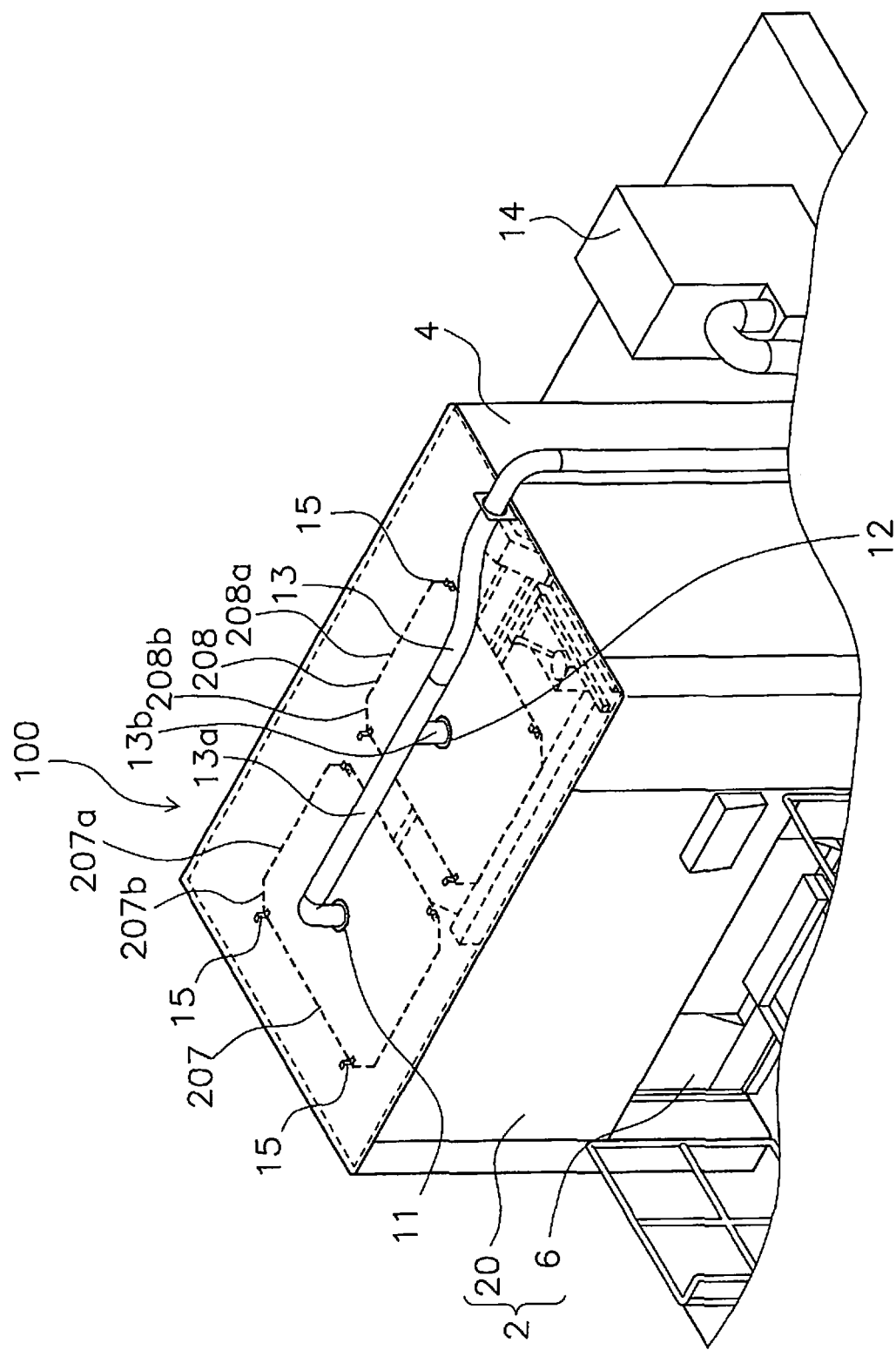
FIG. 12 is an oblique view of a plate-like member in a modification example of Embodiment 1 according to the present invention.

In Embodiment 1 above, the plate-like members 7 and 8 were square in shape, but the four corners may be cut off obliquely. FIG. 12 is an oblique view of a machining room 100 in which plate-like members 207 and 208 are disposed. The four corners of the plate-like members 207 and 208 are cut off obliquely as compared to the plate-like members 7 and 8. As a result, there is less of a difference between the distance from the dust collection ports 11 and 12 to the sides 207a and 208a of the plate-like members 207 and 208 and the distance between from the dust collection ports 11 and 12 to the cut edges 207b and 208b, and the difference in flow rate can be reduced.

Also, the shape of the plate-like members 57 and 58 in Embodiment 2 and the shape of the plate-like members 207 and 208 may be combined, or the shape of the plate-like members 107 and 108 in Embodiment 3 and the shape of the members 207 and 208 may be combined.

(B)

In Embodiments 1 to 3 above, two plate-like members were provided, but the number is not limited to two, and may be one, or three or more. If three or more plate-like members are provided, the area 16 described in the above embodiment in which the plate-like members are disposed includes a plurality of plate-like members and the spacing between adjacent plate-like members.

The plate-like members 7 and 8, 57 and 58, and 107 and 108 are square in plan view, but they are not limited to that shape, and may instead be rectangular, polygonal, elliptical, or circular, for example.

(C)

In Embodiments 1 to 3, the dust collection ports 11 and 12 are disposed in the center of the plate-like members 7 and 8, 57 and 58, or 107 and 108, but the center is not the only option, and the ends may be used instead.

(D)

In Embodiments 1 to 3 above, one dust collection port 11 or 12 is disposed for one plate-like member 7 or 8, 57 or 58, or 107 or 108, but two or more dust collection ports 11 and 12 may be disposed for each of the plate-like members 7 and 8, 57 and 58, or 107 and 108.

The shape of the cutting area (machining table) in which the dust rises is usually rectangular in plan view, so if just one dust collection port is provided in the center of the plate-like members 7 and 8, 57 and 58, or 107 and 108, it is difficult to make the surrounding suction air speed uniform, but providing a plurality of dust collection ports makes it possible to equalize the surrounding suction air speed.

(E)

In Embodiments 1 to 3, the dust collection ports 11 and 12 both have the same diameter, but since the suction force of the dust collection port 12 closer to the dust collector 14 tends to be stronger than that of the dust collection port 11, the diameter of the dust collection port 12 may be made smaller than the diameter of the dust collection port 11 so that the force will be more uniform. Also, instead of varying the diameters of the dust collection port 11 and the dust collection port 12, or along with varying these diameters, the diameter of the duct portion 13b connected to the dust collection port 12 may be made smaller than the diameter of the duct portion 13a connected to the collection port 11.

(F)

In Embodiments 1 to 3, the dust collector 14 is used to collect dust in the machining room 100, but it need not collect dust, and a suction device may be used that is capable of at least sucking up dust in the machining room 100.

The machining room of the present invention has the effect of making it possible to remove dust with a simple mechanism, and is useful as a machining room or the like in which a three-dimensional laser cutter is disposed.

The invention claimed is:

1. A machining room in which a three-dimensional laser cutter configured to be disposed, the machining room comprising:
a ceiling provided with at least one suction port connected to a suction device; and
at least one plate member disposed in a first region below the ceiling, a space existing between the at least one plate member and the ceiling, the at least one plate member has a rectangular shape with four corners of the rectangular shape truncated obliquely,
the ceiling and the at least one plate member being configured and arranged such that a size of the first region is greater than or equal to a size of a second region in which laser cutting is performed by the three-dimensional laser cutter and the first region covers the second region in a plan view, and
the at least one suction port being disposed at a center of the at least one plate member as viewed in the plan view.

2. The machining room according to claim 1, wherein air in the machining room is sucked from the suction port.

3. The machining room according to claim 1, wherein the suction device is a dust collector configured to collect dust in the machining room.

4. The machining room according to claim 1, wherein an airflow toward the suction port is produced in the space.

5. The machining room according to claim 1, wherein the at least one plate member includes a plurality of plate members, the plurality of plate members being disposed in the first region.

6. The machining room according to claim 1, wherein the at least one suction port includes a plurality of suction ports.

7. The machining room according to claim 6, wherein the at least one plate member includes a plurality of plate members.

8. The machining room according to claim 1, further comprising:
    side walls that support the ceiling; and
    a vent hole formed in at least one of the side walls near a floor of the machining room.

9. The machining room according to claim 8, further comprising:
    a blocking component configured to block an emission of scattered laser light from the vent hole to the outside.

10. The machining room according to claim 1, wherein the suction port is disposed on an inside of the at least one plate member as viewed in the plan view.

11. The machining room according to claim 1, wherein the at least one plate member defines a closed surface overlapping the at least one suction port in the plan view.

12. The machining room according to claim 7, wherein each of the plurality of suction ports is disposed at a center of a different one of the plurality of plate member as viewed in the plan view.

13. A machining room in which a three-dimensional laser cutter configured to be disposed, the machining room comprising:
    a ceiling provided with a suction port connected to a suction device; and
    a plate member disposed below the ceiling such that a space exists between the plate member and the ceiling,
    the plate member having a rectangular shape,
    the suction port being disposed at a center of the plate member as viewed in plan view,
    the rectangular shape of the plate member including four corners joined by four peripheral edges, each of the peripheral edges including a first edge portion and a pair of second edge portions, the first edge portion including a center of the peripheral edge and the pair of second edge portions being disposed with the first edge portion therebetween and extending to respective ones of the four corners, and
    the first edge portions and the second edge portions being configured such that a gap between the first edge portions and the ceiling is narrower than a gap between the second edge portions and the ceiling.

14. The machining room according to claim 13, wherein the plate member defines a closed surface overlapping the suction port in the plan view.

15. A machining room in which a three-dimensional laser cutter configured to be disposed, the machining room comprising:
    a ceiling provided with at least one suction port connected to a suction device;
    at least one plate member disposed in a first region below the ceiling, a space existing between the at least one plate member and the ceiling;
    side walls that support the ceiling;
    a vent hole formed in at least one of the side walls near a floor of the machining room; and
    a blocking component configured to block an emission of scattered laser light from the vent hole to the outside,
    the ceiling and the at least one plate member being configured and arranged such that a size of the first region is greater than or equal to a size of a second region in which laser cutting is performed by the three-dimensional laser cutter and the first region covers the second region in a plan view, and
    the blocking component being a wall disposed between the vent hole and an interior of the machining room.

* * * * *